April 19, 1955 C. J. STALEGO 2,706,365
FEEDER FOR MOLTEN THERMOPLASTIC MATERIAL
Filed Feb. 18, 1954 2 Sheets-Sheet 1

INVENTOR.
CHARLES J. STALEGO
BY
ATTYS.

April 19, 1955  C. J. STALEGO  2,706,365
FEEDER FOR MOLTEN THERMOPLASTIC MATERIAL
Filed Feb. 18, 1954  2 Sheets-Sheet 2
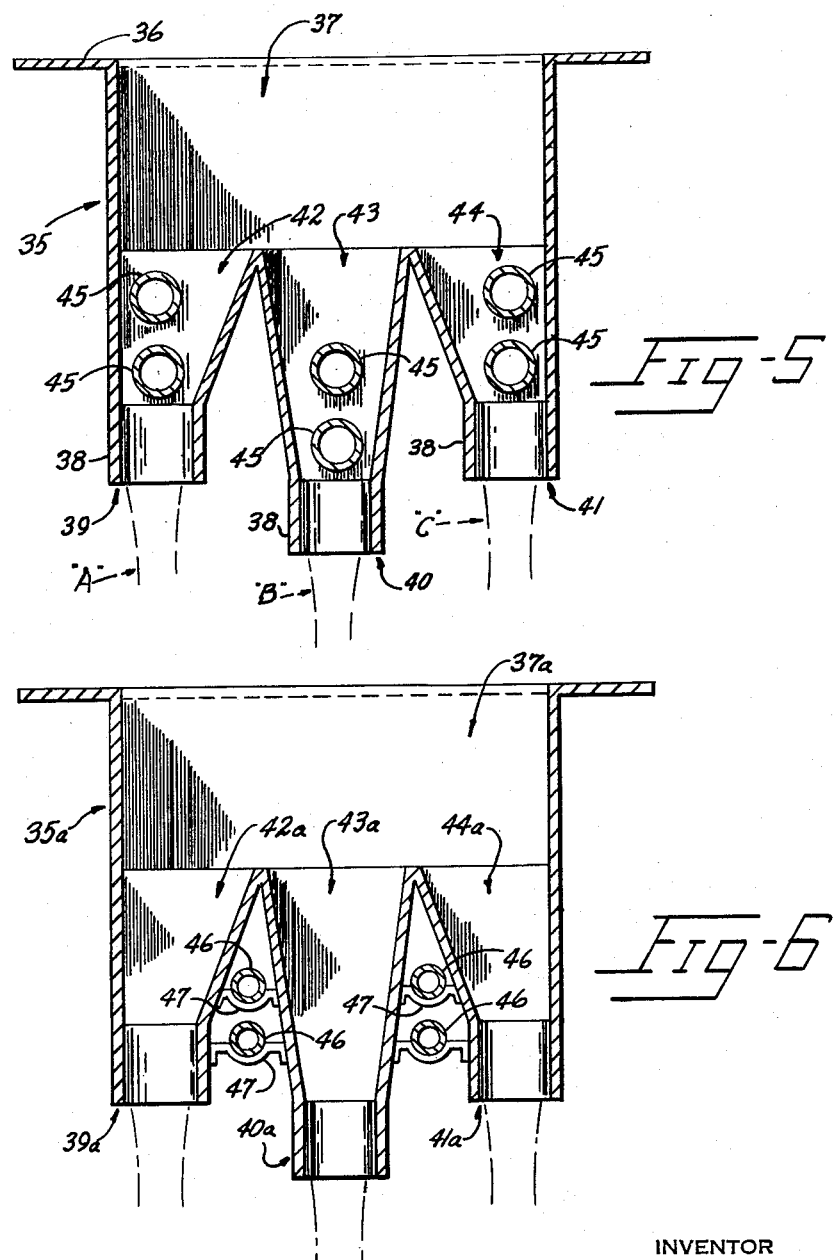
INVENTOR
CHARLES J. STALEGO
BY
ATTORNEYS

United States Patent Office 2,706,365
Patented Apr. 19, 1955

2,706,365

FEEDER FOR MOLTEN THERMOPLASTIC MATERIAL

Charles J. Stalego, Newark, Ohio, assignor to Owens-Corning Fiberglas Corporation, a corporation of Delaware Application February 18, 1954, Serial No. 411,079

10 Claims. (Cl. 49—55)

This application is a continuation-in-part of my two copending applications Serial Nos. 345,311 and 345,312, both filed March 30, 1953, now abandoned.

This invention relates to a feeder for molten thermoplastic material and, more particularly, to a feeder designed for continuously producing streams of thermoplastic material, for example glass, from which filaments of considerable diameter say, .015" can be continuously attenuated.

In the manufacture of fine fibers such as those suitable for use in textiles from heat softenable materials such as glass, it is customary to heat a mass of the material above its melting point and to maintain it in a feeder which has a plurality of minute orifices in its lower surface. Gravity acting upon the glass causes small streams of glass to flow through the orifices. These streams of glass are then elongated mechanically at a high rate of speed, say in the order of 10,000 feet per minute, and attenuated to form fine individual fibers. The elongation, attenuation and "pulling" is usually accomplished by leading the fibers to a suitable rotating drum or package, the rotation of the package serving both to apply the attenuation or "pulling" force and to collect the fibers upon the drum.

Maintenance of a uniform diameter for such continuously pulled fine fibers, while requiring considerable control of temperature and speed of pulling for any given orifice size and desired fiber size, is less difficult than it becomes when the individual fibers assume large size and are better considered to be filaments say in the order of .015" in diameter or larger. Where individual filaments of this diameter are being pulled and attenuated from the streams of glass the problems of reducing the temperature of the glass from its molten temperature at which it flows through the orifices to a proper temperature for so increasing its viscosity as to achieve uniform attenuation, become complex.

The ordinary problems of control of temperature of the mass of molten glass, constancy of attenuation speed, maintenance of uniform ambient or atmospheric conditions, etc., still exist. Added to these problems is the additional problem that the diameter of each stream of glass is large enough so that heat must be rapidly drawn out of the glass during the brief interval between its departure from the mass of molten glass in the feeder and its attenuation into a solid filament. If there is too great a variation in the rate of heat loss of the mass during this brief interval of time the filaments may not maintain a constant temperature, the glass may "wet" the material surrounding the orifices; the filaments may cool so slowly that they are mechanically unstable and they may be pulled apart or the attenuation process may be otherwise completely disrupted. Any such loss of control results not only in loss of material but in loss of time and labor required to clean the feeder orifices and reestablish normal flow.

It is, therefore, the principal object of this invention to provide a feeder for streams of glass of substantial diameters to continuously provide such streams under controlled thermal conditions so as to simplify the attenuation of filaments therefrom.

It is a further object of this invention to provide a feeder in which the individual orifices are so formed as to result in a controlled radiation of heat away from the orifice forming structures thereby carrying heat out of the glass at a controlled rate as it passes through and out of the orifices.

It is yet another object of this invention to provide a feeder structure which is relatively less expensive to construct and can be fabricated to controlled dimensions and wherein each orifice is separated from its neighbor by a minimum of material but in such a manner as to inhibit the tendency of the glass to wet the surface of the material and thus to link adjacent streams to each other.

These and more specific objects and advantages will become apparent from the specification which follows and from the drawings, in which:

Fig. 5 is a vertical sectional view similar to Fig. 2 but of a modification of the invention incorporating means for exercising a greater degree of control over the temperature of the glass.

Fig. 6 is a view similar to Fig. 5 but of a different embodiment of the temperature control modification of the invention shown in Fig. 5.

Figure 1:
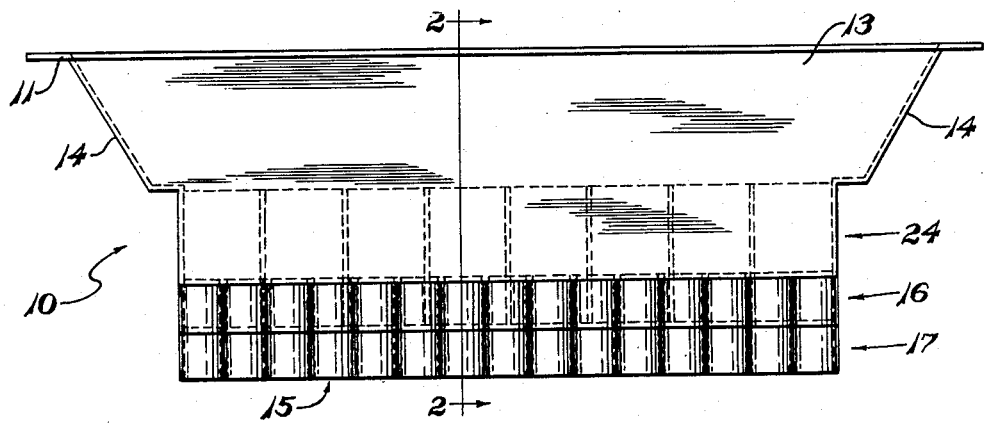
Fig. 1 is a side view in elevation of a feeder embodying the invention.

A feeder embodying the invention is indicated generally by the reference number 10 in Fig. 1 and comprises a horizontally extending flange 11 which forms a rim for a generally rectangular well 12 formed by parallel vertical side walls 13 and inclined end walls 14. The flange 11 is employed to secure the feeder 10 to the underside of a glass melting or storage unit (not shown in the drawings) which may be fabricated from conventional materials, for example from heat insulating ceramic material, and the purpose of which is to provide and maintain a supply of suitable glass or other thermoplastic material which is being handled.

The feeder 10 is provided with a plurality of individual orifice elements 15 arranged in three parallel series generally indicated by the reference numbers 16, 17 and 18. Each of the orifice elements 15 (see Figs. 2 and 3) may be formed, for example, from an axially short section of tubing 19 which is longitudinally split and opened at one side (for example, see the orifice elements 20, 21 or 22 at the left of Fig. 3). The plurality of orifice elements 15 are assembled adjacent each other as shown in cross section in Fig. 3 in the three single row series 16, 17 and 18 and are made integral by welding, brazing, silver soldering or otherwise rigidly attaching each to the other with fillets 23 of the molten welding or soldering material. For example, in some instances where the melter is fabricated from platinum which is used because of its high electric conductivity and high abrasion resistance, the fillets 23 presumably also would be made by using platinum for the soldering material. In any event after an appropriate number of the individual orifice elements 15 are fabricated in the manner which is described to form a single row, viz., the series 16, 17 or 18 as the case might be, the series of orifice elements 15 is assembled on the lower end of one of three associated channels 24, 25 or 26. The channels 24, 25 and 26 are formed from lower extensions of the side walls 13 of the feeder 10 and angularly inclined side walls 27 for the inner sides of the channels 24 and 26 and a pair of similar inclined side walls 28 for the channel 25. Each of the channels 24, 25 and 26 has a pair of end walls 29 at the ends.

The inner walls 27 of the two channels 24 and 26 are so inclined that their lower edges are spaced from the lower edges of the side walls 13 a distance exactly equal to the spacing between lateral walls of the tubing forming the orifice elements 15. Perforated bottom plates 30 are secured on the lower edges of the side walls 27 and 28 and the upper edges of the series of orifice elements 15 are appropriately secured to the undersurfaces of the bottom plates 30.

It will be observed in Figs. 1 and 2 that the centermost channel 25 is dropped below the side channels 24 and 26 so that the series 17 of orifice elements 15 is lower than the side series 16 and 18 of the orifice elements 15.

Cross fins 31 are secured to the inner side walls of the channels 24, 25 and 26 and extend at least part way thereacross. The cross fins 31 in the embodiment of the invention shown in the drawings extend only part way across the channels 24, 25 and 26 but may of course extend all the way across or may extend from one side or the other or may be perforated rather than solid as shown in the drawings. The purpose of the cross fins, as will be explained later, is not varied in nature but only in degree by the precise number, location, size or shape of the cross fins 31.

Figure 2:
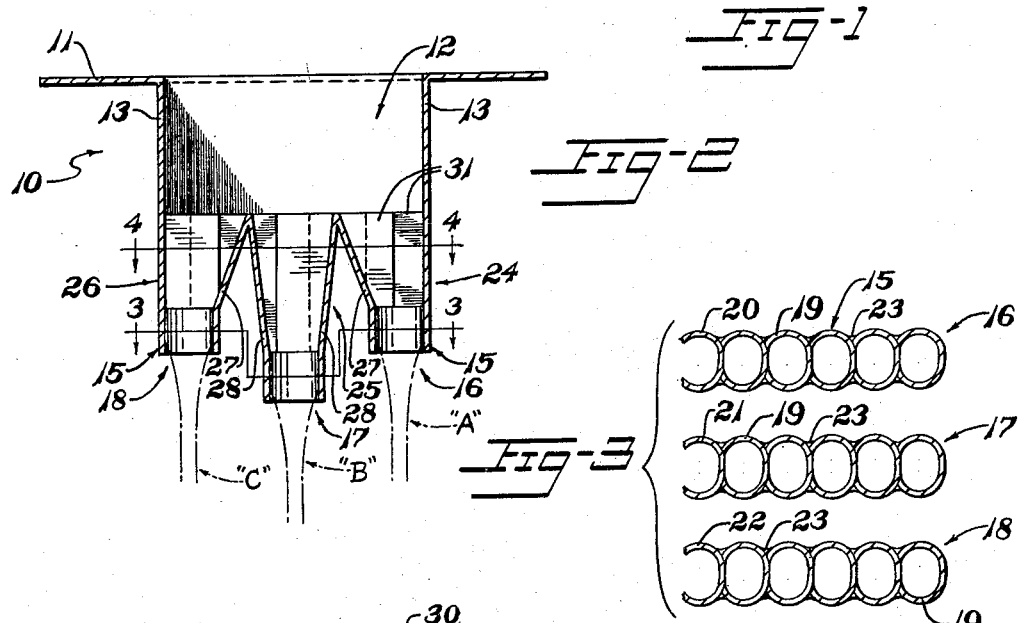
Fig. 2 is a vertical sectional view taken substantially on the line 2—2 of Fig. 1.
Figure 3:
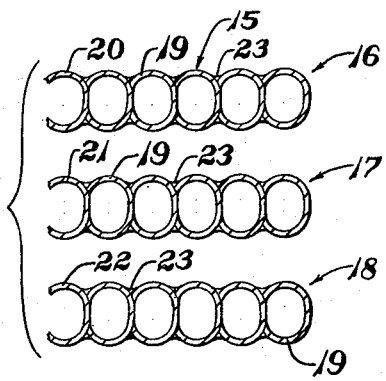
Fig. 3 is a fragmentary horizontal sectional view taken along the line 3—3 of Fig. 2.
Figure 4:
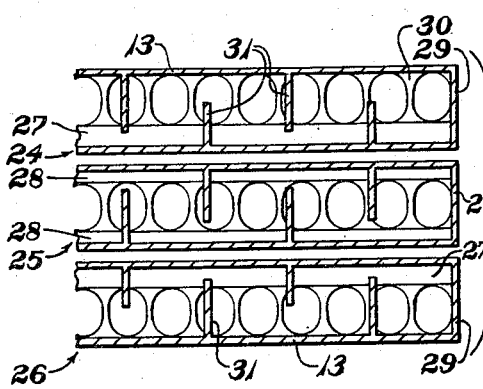
Fig. 4 is a similar view taken along the line 4—4 of Fig. 2.

It will be observed particularly in Fig. 2 where broken line indications are given of three filaments A, B and C that a filament in its attenuated size is considerably smaller in diameter than the diameter of one of the individual orifice elements 15 through which the stream to be attenuated into the filament flows. This results from the fact that the molten glass or other thermoplastic material being attenuated must necessarily be in a fluid state when it leaves the orifice element 15 and its viscosity must increase rapidly as it is pulled away and attenuated in order that the filament pulled may have mechanical stability.

A feeder embodying the invention controls the condition of the glass at its moment of departure from the orifice elements 15 through the operation of several structural features. While the glass in the well 12 may be kept in a highly fluid state and at elevated temperature in order that it may easily flow downwardly through the channels 24, 25 and 26, its temperature must decrease by the time it emerges from the orifice elements 15 to such a point that its viscosity has closely approached the condition where it can only be attenuated to a slight degree and will rapidly become too solid for further change in dimension. It is necessary, therefore, that the temperature be dropped rapidly and that it be dropped in a controlled manner. The cross fins 31 by lying in the path of flow of the molten glass withdraw heat from the interior of the glass in each of the channels 24, 25 and 26 and conduct such heat to the side walls 13, 27 or 28 of the channels. Heat thus conducted to the side walls is in addition to the heat transferred to the side walls from the glass passing along the side walls. The cross fins 31 by extending into the interior of the mass of glass in each of the channels 24, 25 and 26 facilitate the conduction of heat from the mass of glass because the material from which the cross fins 31 are made is a better conductor of heat than glass itself.

The heat conducted to the side walls 13, 27 and 28 by the cross fins 31 plus the heat transferred directly to the side walls 13, 27 and 28 by the glass flowing therealong is radiated away from the melter by the walls 13, 27 and 28. The walls 13 are on the exterior of the entire unit and thus no structures interfere with radiation of heat therefrom. However, the inner walls 27 of the channels 24 and 26 and the walls 28 of the central channel 25 are closely adjacent each other. Heat radiated from each of these walls reflects from the other walls and is reflected downwardly because of the angular relationship, for example, between the wall 27 of the channel 24 and the adjacent wall 28 of the channel 25 and between the two adjacent walls 28 of the channel 25 and 27 of the channel 26.

The heat radiating from each of these pairs of nearby walls is reflected by the other and may be reflected again before it radiates downwardly and outwardly from between the lower ends of the side walls and the lower ends of the inner surfaces of the orifice elements 15. By lowering the central channel 25 and its orifice elements 17 below the horizontal level of the outer channels 24 and 26 and their orifice elements 15, additional area is exposed to the atmosphere for direct radiation without reflection from the nearby walls of the outer channels 24 and 26 and their orifice elements 15.

Although glass flowing down the outer walls 13 of the feeder 10 may be heated directly by the walls 13 when the feeder 10 is energized as a heating element, the unobstructed radiating surface of the outer walls of the two outer channels 24 and 26 may more than overbalance the additional heat which may be present in the glass located therein. Dropping the central channel 25 and its series 17 of orifice elements provides the greater length of radiating surface in the walls 28 which may balance out the heat differences that may be present in the glass entering the three channels.

The combination of the cross fins 31 and the vertically staggered positioning of the central series of orifice elements 17 and side series 16 and 18 results in there being substantially uniform glass conditions at the ends of the orifice elements 15. Thus when all of the filaments in the series A, B and C are pulled at a uniform rate of speed and to the same points, the controlled radiation of heat resulting from the feeder design embodying the invention produces filaments of uniform cross section from all three series of orifice elements 16, 17 and 18.

The modification of the invention shown in Figs. 5 and 6 provides for additional means for controlling the temperature of the glass during its change from a highly fluid condition to the less fluid, more viscous condition in which it is capable of being uniformly and continuously attenuated.

The embodiment of the invention shown in Fig. 5 comprises a feeder generally indicated at 35 which has a horizontally extending flange 36, a generally rectangular well 37 and three series of individual orifice elements 38 arranged to form three rows of elements generally indicated at 39, 40 and 41 and similar to the three rows of elements 16, 17 and 18 of Figs. 1–4. The series 39, 40 and 41 of the elements 38 are located respectively at the bottoms of three parallel spaced channels generally indicated at 42, 43 and 44.

Under many conditions of operation it is desirable that additional control over the temperature and thus the viscosity of the glass flowing through the channels 42, 43 and 44 should be provided. To this end each of the channels 42, 43 and 44 of Fig. 5 has a pair of vertically spaced coolant tubes 45 extending longitudinally therethrough. The coolant tubes 45 are thus embedded in the mass of glass which flows downwardly through the channels and the temperature of coolant circulated through the tubes directly affects the temperature of the glass flowing through the channels. It is thus possible either to reduce the temperature of the glass flowing downwardly or, if desired, to heat the glass. In either event the operator may control the change of temperature of the glass as it passes through the channels 42, 43 and 44 with a nicety greater than that possible where radiation only is relied upon to carry away the heat from the glass so that it reaches a state of viscosity suitable for attenuation. As in Fig. 2, filaments pulled from the orifice elements 38 in the three rows 39, 40 and 41 are indicated, respectively, by the letters A, B and C in Fig. 5.

Fig. 6 shows a different embodiment of the modification of the invention of Fig. 5 wherein pairs of coolant tubes 46 may be carried by mounting channels 47 located in the triangular spaces between three channels 42a, 43a and 44a of a feeder generally indicated at 35a. Location of the coolant tubes between the channels 42a, 43a and 44a may be desirable under some operating conditions where the presence of the tubes and their coolant in the mass of glass is not advantageous. The passage, for example, of a cold coolant fluid through the tubes 46 between the glass carrying channels carries away heat radiated into the spaces between the walls of the channels and may be employed to carry the heat away at a rate either greater or slower than it would otherwise be radiated. Again, as in the embodiment of Fig. 5, a nicer control over the rate of heat exchange of the glass may be controlled.

I claim:

1. A feeder for molten glass comprising, in combination, a generally rectangular, open topped body having side and end walls, partition means extending downwardly from said body and longitudinally thereof forming a plurality of longitudinally extending, laterally spaced channels opening upwardly into said body and a series of orifice forming elements along the bottom of each of said channels, the orifice forming elements in each of said channels, the orifice forming elements in each of said series being closely adjacent longitudinally and the series being spaced laterally.

2. A feeder for molten glass comprising, in combination, a generally rectangular, open topped body having side and end walls, partition means extending downwardly from said body and longitudinally thereof forming a plurality of longitudinally extending, laterally spaced channels opening upwardly into said body and means forming a series of orifices in the bottom of each of said channels, the bottom of at least one of said channels at the side of said feeder lying at a horizontal level above the bottom of an adjacent channel.

3. A feeder for molten glass comprising, in combination, a generally rectangular, open topped body having side and end walls, partition means extending downwardly from said body and longitudinally thereof forming at least three longitudinally extending, laterally spaced channels opening upwardly into said body, adjacent walls of any two of said channels being angularly inclined to each other and forming inverted V-shaped heat radiation passageways opening downwardly from between adjacent channels, and means forming a series of orifices in the bottom of each of said channels.

4. A feeder for molten glass comprising, in combination, a generally rectangular, open topped body having side and end walls, partition means extending downwardly from said body and longitudinally thereof forming at least three longitudinally extending, laterally spaced channels opening upwardly into said body, adjacent walls of any two of said channels being angularly inclined to each other and forming inverted V-shaped heat radiation passageways opening downwardly from between adjacent channels, and means forming a series of orifices in the bottom of each of said channels, the outer ones of said channels extending downwardly to a horizontal level above that of an adjacent channel.

5. A feeder for molten glass comprising, in combination, a generally rectangular, open topped body having side and end walls, partition means extending downwardly from said body and longitudinally thereof forming a plurality of longitudinally extending, laterally spaced channels opening upwardly into said body, a series of orifice forming elements along the bottom of each of said channels, the orifice forming elements in each of said series being closely adjacent longitudinally and the series being spaced laterally, and at least one horizontal coolant tube extending longitudinally of said laterally spaced channels and located at a horizontal level between the top of said channels and said orifice forming elements.

6. A feeder for molten glass comprising, in combination, a generally rectangular, open topped body having side and end walls, partition means extending downwardly from said body and longitudinally thereof forming a plurality of longitudinally extending, laterally spaced channels opening upwardly into said body, means forming a series of orifices in the bottom of each of said channels, the bottom of at least one of said channels at the side of said feeder lying at a horizontal level above the bottom of an adjacent channel, and at least one horizontal coolant tube extending longitudinally of said laterally spaced channels and located at a horizontal level between the top of said channels and said orifice forming means.

7. A feeder for molten glass comprising, in combination, a generally rectangular, open topped body having side and end walls, partition means extending downwardly from said body and longitudinally thereof forming at least three longitudinally extending, laterally spaced channels opening upwardly into said body, adjacent walls of any two of said channels being angularly inclined to each other and forming inverted V-shaped heat radiation passageways opening downwardly from between adjacent channels, means forming a series of orifices in the bottom of each of said channels, and at least two laterally spaced horizontal coolant tubes extending longitudinally of said laterally spaced channels and located at a horizontal level between the top of said channels and said orifice forming means.

8. A feeder according to claim 7 in which said coolant tubes are located in the inverted V-shaped passageways.

9. A feeder according to claim 7 in which said coolant tubes are located in and extend through the laterally spaced channels.

10. A feeder for molten glass comprising, in combination, a generally rectangular, open topped body having side and end walls, partition means extending downwardly from said body and longitudinally thereof forming at least three longitudinally extending, laterally spaced channels opening upwardly into said body, adjacent walls of any two of said channels being angularly inclined to each other and forming inverted V-shaped heat radiation passageways opening downwardly from between adjacent channels, means forming a series of orifices in the bottom of each of said channels, the outer ones of said channels extending downwardly to a horizontal level above that of an adjacent channel, and at least two laterally spaced horizontal coolant tubes extending longitudinally of said channels and located at a horizontal level between the tops of said channels and the uppermost ones of said orifice forming means.

References Cited in the file of this patent

UNITED STATES PATENTS

| | | |
|---|---|---|
| 2,229,489 | Barnard | Jan. 21, 1941 |
| 2,303,657 | Parsons | Dec. 1, 1942 |
| 2,306,164 | Harrison | Dec. 22, 1942 |
| 2,335,135 | Staelin | Nov. 23, 1943 |
| 2,407,295 | Simison et al. | Sept. 10, 1946 |
| 2,485,807 | Berthold et al. | Oct. 25, 1949 |
| 2,489,508 | Stalego | Nov. 29, 1949 |
| 2,634,553 | Russell | Apr. 14, 1953 |